(12) United States Patent
Taniguchi et al.

(10) Patent No.: US 8,553,390 B2
(45) Date of Patent: Oct. 8, 2013

(54) CERAMIC ELECTRONIC COMPONENT

(75) Inventors: Susumu Taniguchi, Tokyo (JP); Miyuki Yanagida, Tokyo (JP); Hisayuki Abe, Tokyo (JP); Yukari Inoue, Tokyo (JP); Masataka Kitagami, Tokyo (JP)

(73) Assignee: TDK Corporation, Tokyo (JP)

( * ) Notice: Subject to any disclaimer, the term of this patent is extended or adjusted under 35 U.S.C. 154(b) by 21 days.

(21) Appl. No.: 13/177,878

(22) Filed: Jul. 7, 2011

(65) Prior Publication Data

US 2012/0007709 A1    Jan. 12, 2012

(30) Foreign Application Priority Data

Jul. 9, 2010    (JP) ................................ P2010-157154

(51) Int. Cl.
  *H01G 4/06*    (2006.01)
  *H01G 4/228*   (2006.01)
  *H01G 4/005*   (2006.01)

(52) U.S. Cl.
  USPC .................. 361/321.1; 361/321.2; 361/306.3; 361/303

(58) Field of Classification Search
  USPC ........................ 361/321.1, 306.3, 303, 321.2
  See application file for complete search history.

(56) References Cited

U.S. PATENT DOCUMENTS

| 2007/0278907 A1* | 12/2007 | Kondo et al. ................. 310/364 |
| 2009/0002920 A1* | 1/2009 | Itamura et al. ............. 361/321.3 |
| 2010/0202098 A1 | 8/2010 | Yanagida et al. |
| 2011/0317328 A1 | 12/2011 | Taniguchi et al. |

FOREIGN PATENT DOCUMENTS

| JP | 7-86080 | 3/1995 |
| JP | 8-97072 | 4/1996 |
| JP | 11307391 A * | 11/1999 |
| JP | 2003-243245 | 8/2003 |
| JP | 2010-165910 | 7/2010 |

OTHER PUBLICATIONS

U.S. Office Action dated Jun. 22, 2012 that issued in U.S. Appl. No. 13/166,993 including a Double Patenting Rejection on pp. 2-3.

* cited by examiner

*Primary Examiner* — Eric Thomas
*Assistant Examiner* — Arun Ramaswamy
(74) *Attorney, Agent, or Firm* — Drinker Biddle & Reath LLP

(57) ABSTRACT

A ceramic electronic component 100 includes a ceramic body 1 in which internal electrodes containing a metal component is buried, and a pair of terminal electrodes 3 provided to cover both end surfaces 11 of the ceramic body to which the internal electrodes are exposed. Each of the terminal electrodes 3 has a first electrode layer and a second electrode layer formed by baking a conductive green sheet from a side close to the ceramic body 1. The second electrode layer contains the metal component diffused from the internal electrodes.

3 Claims, 5 Drawing Sheets

CERAMIC ELECTRONIC COMPONENT

BACKGROUND OF THE INVENTION

1. Field of the Invention

The present invention relates to a ceramic electronic component.

2. Related Background Art

Ceramic electronic components such as a monolithic ceramic chip capacitor (MLCC) having a ceramic body and a terminal electrode on its end surface are used for various electronic devices. Recently, the demand for smaller and higher capacity ceramic electronic components has been growing to meet the increasing needs of downsizing and high performance of electronic devices.

A terminal electrode provided on a ceramic electronic component usually includes a base electrode layer and an upper electrode layer formed on the base electrode layer. The base electrode layer is usually provided by a baked electrode layer formed by applying a conductive paste containing powder of noble metal such as silver and palladium, or powder of base metal such as copper and nickel, and a glass frit to a ceramic body and baking it. Electroplating is usually applied to the baked electrode layer, so that a plating layer is provided as the upper electrode layer.

Since the plating process is used for forming the upper electrode layer as described above, the baked electrode layer is required to have the property that the plating layer can be easily formed. For example, Patent Document 1 (Japanese Patent Laid-Open No. 2003-243245) discloses that, in order to form a uniform metal plating layer on a surface of a baked electrode layer, the baked electrode layer is formed by baking a conductive paste containing a metal component and a glass component and is covered with a coat layer formed using a material that does not contain a glass component.

SUMMARY OF THE INVENTION

To increase the capacity of a monolithic ceramic chip capacitor, the deterioration of insulation resistance needs to be suppressed. One of the reasons for the deterioration of insulation resistance is that components of a plating liquid during an electroplating process and hydrogen generated at the time of plating enter into a ceramic body after a baked electrode layer is formed. A base electrode layer may be thickened to prevent the ingress of the components of the plating liquid and hydrogen. However, it runs counter to the demand for downsizing of ceramic electronic components.

The base electrode layer is usually formed by applying a paste on a surface of a ceramic body and baking it. Thus, the size of the baked electrode layer tends to be varied largely depending on the adhered amount of the conductive paste. Also, with the flow of the conductive paste, the thickness of the baked electrode layer at a circumferential edge of an end surface of the ceramic body or a corner sandwiched between the end surface and a side surface tends to be smaller than the thickness of the baked electrode layer at a central portion of the end surface of the ceramic body. When there is a portion having a small thickness, components of a plating liquid and hydrogen easily enter into the ceramic body and thus the ceramic body is partially corrosive.

To suppress the corrosion of the ceramic body or internal electrode, it may be effective to prevent the ingress of the components of the plating liquid and hydrogen. To prevent the ingress of the components of the plating liquid and hydrogen, it may be effective to densify the baked electrode layer. To densify the baked electrode layer, for example, the content of a glass component in the baked electrode layer may be reduced. However, at this time, the adhesiveness between the ceramic body and the terminal electrode may be impaired. When the adhesiveness between the ceramic body and the terminal electrode is reduced, it is highly likely that the terminal electrode and the ceramic body are peeled from each other after soldering and the ceramic electronic component is damaged. Thus, a ceramic electronic component capable of sufficiently suppressing corrosion of a ceramic body during a manufacturing process and sufficiently ensuring adhesiveness of the ceramic body and a terminal electrode has been desired.

The present invention was made in view of the above-described circumstances. An object of the present invention is to provide a ceramic electronic component capable of being downsized and having excellent adhesive strength between a terminal electrode and a ceramic body.

According to an aspect of the present invention, a ceramic electronic component includes a ceramic body in which internal electrodes containing a metal component is buried and a pair of terminal electrodes provided to cover both end surfaces of the ceramic body to which the internal electrodes are exposed. Each of the terminal electrodes has a first electrode layer and a second electrode layer from a side close to the ceramic body, the second electrode layer is formed by baking a conductive green sheet and the second electrode layer contains the metal component which is diffused from the internal electrodes.

Since the second electrode layer is formed by baking the conductive green sheet in such a ceramic electrode component, the variation of the thickness of the terminal electrodes can be reduced as compared when a baked electrode layer is formed using only a conductive paste. Thus, the ceramic electronic component can have excellent dimensional accuracy and can be downsized. Also, the second electrode layer can be denser than an electrode layer formed using a conductive paste. Therefore, corrosion of the ceramic body can be suppressed during a plating process for forming a plating layer. Further, since the second electrode layer contains the metal component diffused from the internal electrodes, the terminal electrode and the ceramic body are tightly attached to each other by the metal component. Thus, the adhesive strength between the terminal electrode and the ceramic body is improved.

It is preferable that the metal component diffused from the internal electrodes be eccentrically-located in a crystal grain boundary in the second electrode layer in the ceramic electronic component according to the aspect of the present invention. Thus, even when the content of the metal component diffused from the internal electrodes in the second metal component is small, the second electrode layer is tightly attached to the ceramic body through the first electrode layer, Consequently, the adhesive strength between the terminal electrode and the ceramic body can be further improved.

It is preferable that each of the terminal electrodes in the ceramic electrode component according to the aspect of the present invention have a third electrode layer provided by a plating layer covering the second electrode layer. Thus, electrode corrosion by solder in soldering the ceramic electrode component to a circuit board can be sufficiently suppressed.

It is preferable that the second electrode layer is thicker than the first electrode layer in the ceramic electrode component according to the aspect of the present invention. Accordingly, the variation of the thickness of the terminal electrode can be smaller, and the dimensional accuracy can be further improved. Also, since the second electrode layer has a high shielding property relative to a plating liquid and hydrogen, the plating liquid and hydrogen can be sufficiently prevented from entering into the ceramic body when the plating layer is formed. Further, since a gap between the second electrode layer and the ceramic body can be small, the adhesive strength between the terminal electrode and the ceramic body can be further improved.

According to the present invention, it is preferable that the content of the metal component derived from the internal electrodes in the second electrode layer be 0.45 to 5.0 mass %. Thus, when the plating layer is provided as the third electrode layer, the adhesiveness between the second electrode layer and the third electrode layer can be improved while maintaining the high adhesive strength between the second electrode layer and the ceramic body.

It is preferable that the second electrode layer be provided to cover part of the first electrode layer on at least one side surface orthogonal to the end surfaces of the ceramic body in the ceramic electrode component according to the aspect of the present invention. Accordingly, as compared when the second electrode layer covers the entire first electrode layer on the side surface, stress generated by the difference in expansion factor and shrinkage factor based on difference in sintering of the electrode layers can be reduced and peeling generated on between the first electrode layer and the ceramic body can be prevented. Therefore, the metal component of the internal electrodes buried in the ceramic body can be more smoothly diffused in the second electrode layer through the first electrode layer. Thus, the reliability of the ceramic electronic component can be further improved. Also, since the stress generated by the difference in shrinkage factor based on the difference in sintering of the electrode layers can be reduced as compared when the second electrode layer covers the entire first electrode layer on the side surface, the peeling between the second electrode layer and the first electrode layer and cracks generated on the terminal electrodes can be prevented. Thus, the reliability of the ceramic electronic component can be further improved.

The ceramic electronic component capable of being downsized and having excellent adhesive strength between the terminal electrode and the ceramic body can be provided according to the aspect of the present invention.

DESCRIPTION OF THE PREFERRED EMBODIMENTS

Figure 1:
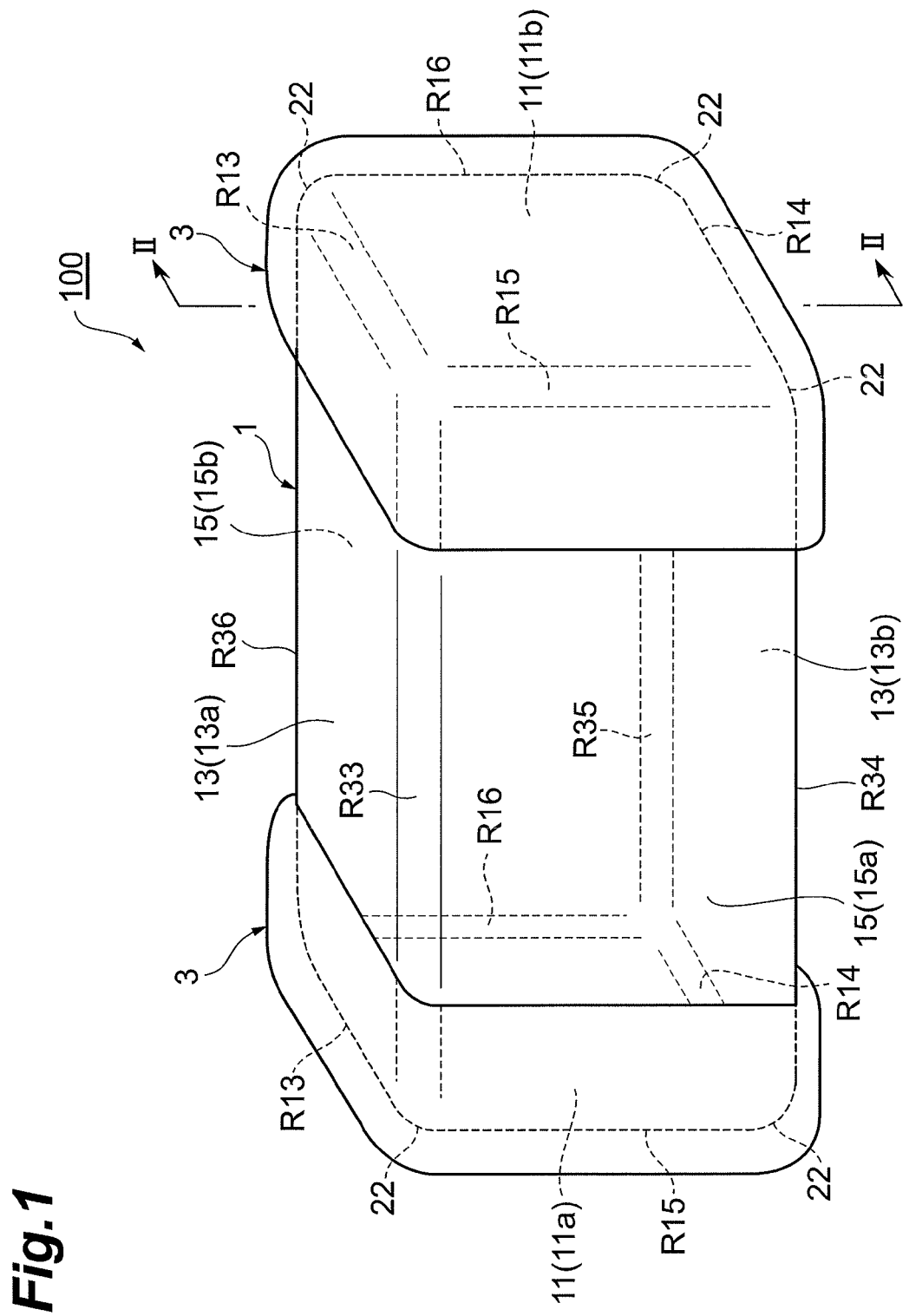
FIG. 1 is a perspective view of a ceramic electronic component according to a preferred embodiment of the present invention.

A preferred embodiment of the present invention will be explained below with reference to the drawings. It should be noted that the same reference numerals will be assigned to the same or equivalent parts and a description thereof will be omitted.

FIG. 1 is a perspective view of a ceramic electronic component according to the preferred embodiment of the present invention. The ceramic electronic component 100 according to this embodiment is a chip-shaped multilayer ceramic capacitor. The ceramic electronic component 100 has an approximately rectangular parallelepiped shape. For example, the ceramic electronic component 100 has the length of approximately 2.0 mm in the longitudinal direction and the length of approximately 1.2 mm in the width direction and the thickness direction.

The ceramic electronic component 100 includes a ceramic body (chip body) 1 having an approximately rectangular parallelepiped shape, and a pair of terminal electrodes 3 formed on both ends of the ceramic body 1. The ceramic body 1 includes an end surface 11a and an end surface 11b which are opposite to each other (hereinafter collectively referred to as "end surface 11"), a side surface 13a and a side surface 13b which are opposite to each other and orthogonal to the end surface 11 (hereinafter collectively referred to as "side surface 13"), and a side surface 15a and a side surface 15b which are opposite to each other and orthogonal to the end surface 11 (hereinafter collectively referred to as "side surface 15"). The side surface 13 and the side surface 15 are orthogonal to each other.

The ceramic body 1 includes a corner R13 between the end surface 11 and the side surface 13a, a corner R14 between the end surface 11 and the side surface 13b, a corner R15 between the end surface 11 and the side surface 15a, a corner R16 between the end surface 11 and the side surface 15b, a corner R33 between the side surface 13a and the side surface 15a, a corner R34 between the side surface 15a and the side surface 13b, a corner R35 between the side surface 13b and the side surface 15b, and a corner R36 between the side surface 15b and the side surface 13a.

The corners R13, R14, R15, and R16 (hereinafter collectively referred to as "R13 to R16") and the corners R33, R34, R35, and R36 (hereinafter collectively referred to as "R33 to R36") are R-shaped portions formed by polishing the ceramic body 1. Since the ceramic body 1 has such R-shaped portions, the ceramic body 1 may be prevented from being damaged at the corners R13 to R16 and R33 to R36. For example, a curvature radius of the corner of the ceramic body 1 may be 3 to 15% of the length of the ceramic electronic component 100 in the width direction.

The terminal electrodes 3 cover the end surfaces 11 and the corners R13 to R16 of the ceramic body 1, and integrally cover part of the side surfaces 13 and 15 on the sides close to the end surfaces 11. Thus, the terminal electrodes 3 are provided to cover corner tip portions 22 of the ceramic body 1.

Figure 2:
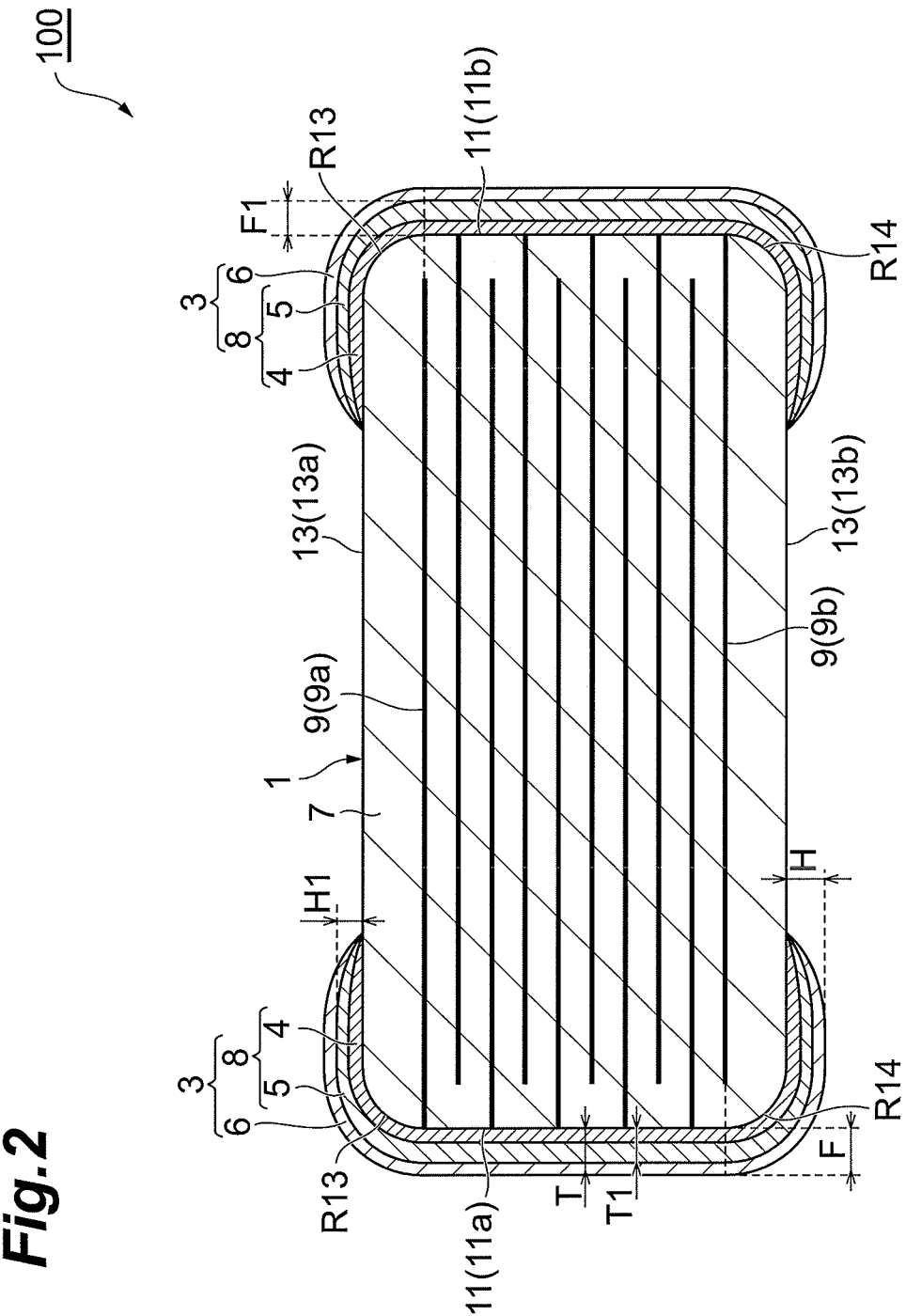
FIG. 2 is a cross-sectional view schematically showing the ceramic electronic component taken along the line II-II of FIG. 1.

FIG. 2 is a cross-sectional view schematically showing the ceramic electronic component taken along the line II-II of FIG. 1. In other words, FIG. 2 shows a cross-sectional structure of the ceramic electronic component 100 when the ceramic electronic component 100 shown in FIG. 1 is cut at the surface which is orthogonal to the side surfaces 13 and parallel to the side surfaces 15.

The ceramic body 1 has a laminated structure in which a plurality of dielectric layers 7 and internal electrodes 9 provided therebetween are laminated. In other words, the plurality of dielectric layers 7 and the plurality of internal electrodes 9 are alternately laminated. The plurality of dielectric layers 7 and the plurality of internal electrodes 9 are laminated in the direction orthogonal to the direction where the pair of end surfaces 11 including the terminal electrodes 3 are opposite to each other and parallel to the direction where the pair of side surfaces 13 are opposite to each other. In FIG. 2, the laminated number of the dielectric layers 7 and the internal electrodes 9 is provided to be easily visible on the drawing for facilitating the explanation. However, the laminated number of the dielectric layers 7 and the internal electrodes 9 may be appropriately changed. For example, the laminated number of the dielectric layers 7 and the internal electrodes 9 may be a few dozen or approximately 100 to 500. Also, the dielectric layers 7 may be integrated such that the boundaries therebetween cannot be recognized.

The internal electrodes 9a are electrically connected to the terminal electrode 3 close to one end surface 11a, and are electrically insulated to the terminal electrode 3 close to the other end surface 11b. Also, the internal electrodes 9b are electrically connected to the terminal electrode 3 close to the other end surface 11b, and are electrically insulated to the terminal electrode 3 close to the one end surface 11a. The internal electrodes 9a and the internal electrodes 9b are alternatively laminated and the dielectric layers 7 are interposed therebetween. The ceramic electronic component 100 according to this embodiment has excellent insulation reliability between the terminal electrode 3 close to the end surface 11a and the internal electrodes 9b, and excellent insulation reliability between the terminal electrode 3 close to the end surface 11b and the internal electrodes 9a. Preferably, the internal electrodes contain base metal such as copper and nickel as a metal component. More preferably, the internal electrodes contain nickel.

The terminal electrode 3 includes a baked electrode layer 8 having a first electrode layer 4 and a second electrode layer 5, and a third electrode layer 6 from the side close to the ceramic body 1. The terminal electrode 3 has the maximum thicknesses T and H on the end surface 11 and the side surface 13 (side surface 15) of the ceramic body 1 respectively. Also, the terminal electrode 3 has the thickness F on an extended line of the internal electrode 9b disposed on the outermost side toward the end surface 11a. To ensure excellent insulation reliability and connection reliability, it is preferable that the terminal electrode in the vicinity of the tip portion 22 of the ceramic body 1 (the thickness F in FIG. 2) be thickened. However, when the baked electrode layer 8 of the terminal electrode 3 is formed using only a conductive paste like a conventional ceramic electronic component and the thickness F is thickened, the thicknesses of the terminal electrode 3 on the end surface and the side surface (the thickness T and the thickness H in FIG. 2) are thickened, thereby preventing the downsizing of the ceramic electronic component.

In the ceramic electronic component 100 according to this embodiment, the second electrode layer 5 is formed using a conductive green sheet. Accordingly, as compared when the baked electrode layer 8 is formed using only the conductive paste, the thickness F can be sufficiently thickened while the thicknesses H and T of the terminal electrode 3 are maintained to be thin. Thus, the ceramic electronic component 100 can be sufficiently downsized and have excellent reliability.

To downsize the ceramic electronic component and ensure the sufficiently high reliability, the thickness H of the terminal electrode 3 of the ceramic electronic component 100 is preferably 10 to 60 μm, more preferably 10 to 40 μm. For the same purpose, the thicknesses F and T of the terminal electrode 3 of the ceramic electronic component 100 is preferably 10 to 60 μm, more preferably 10 to 40 μm. Further, for the same purpose, a ratio of the thickness F relative to the thickness T of the terminal electrode 3 is preferably 0.6 or more, more preferably 0.7 to 1.0.

Preferably, the terminal electrode 3 contains metal or alloy containing at least one element selected from Cu, Ag, Pd, Au, Pt, Fe, Zn, Al, Sn, and Ni. Thus, the ceramic electronic component has excellent connection reliability. The dielectric layer 7 contains for example, barium titanate.

The terminal electrode 3 covers the entire end surface 11 of the ceramic body 10, and covers part of the side surfaces 13 and 15 of the ceramic body 1 orthogonal to the end surface 11 to wrap around the side surfaces 13 and 15. The terminal electrode 3 has a laminated structure in which the first electrode layer 4, the second electrode layer 5, and the third electrode layer 6 are laminated in this order from the side close to the ceramic body 1 on the end surface 11 and part of the side surfaces 13 and 15 of the ceramic body 1. To further enhance the adhesive strength between the ceramic body 1 and the terminal electrode 3, it is preferable that the content of the glass component in the first electrode layer 4 is higher than that in the second electrode layer 5.

For example, the first electrode layer 4 is formed by baking a conductive paste containing a conductive metal powder, a glass fit, and at least one of a binder, a dispersant, and a solvent. The first electrode layer 4 contains, for example, a glass component and metal or alloy containing at least one element selected from Cu, Ag, Pd, Au, Pt, Fe, Zn, Al, Sn, and Ni. The total content of the metal or alloy in the first electrode layer 4 is preferably 50 to 80 mass %, more preferably 60 to 70 mass %. The first electrode layer 4 is disposed between the laminated body 1 and the second electrode layer 5, and is tightly attached to the laminated body 1 and the second electrode layer 5.

The thickness of the first electrode layer 4 is thinner than the thickness of the second electrode layer 5. Thus, the second electrode layer 5 is disposed close to the ceramic body 1. The second electrode layer 5 is tightly attached to the first electrode layer 4 by the metal component diffused from the internal electrodes 9. The thickness of the first electrode layer 4 is preferably 0.5 to 15 μm, more preferably 1 to 8 μm.

For example, the second electrode layer 5 is formed by baking a conductive green sheet containing a conductive metal powder, a glass fit, and at least one of a binder, a dispersant, and a solvent. Accordingly, the second electrode layer 5 has high dimensional accuracy. The size and shape of the baked electrode layer 8 and the terminal electrode 3 are adjusted with high accuracy. Thus, the baked electrode layer 8 and the terminal electrode 3 can be disposed with high positional accuracy.

For example, the second electrode layer 5 mainly contains metal or alloy containing at least one element selected from Cu, Ag, Pd, Au, Pt, Fe, Zn, Al, Sn, and Ni. The total content of the metal or alloy in the second electrode layer 5 is preferably 60 to 90 mass %, more preferably 70 to 80 mass %. Since the total content of metal or alloy in the second electrode layer 5 is higher than that in the first electrode layer 4, the second electrode layer 5 has a sufficiently dense structure and a high shielding property. Also, product materials such as components of a plating liquid and hydrogen generated during a plating process can be sufficiently prevented from entering into the ceramic body 1.

The thickness of the second electrode layer 5 is thicker than the thickness of the first electrode layer 4. Accordingly, components of a plating liquid or hydrogen generated during a plating process can be sufficiently prevented from entering into the ceramic body 1. The thickness of the second electrode layer 5 is preferably 8 to 30 μm, more preferably 8 to 12 μm. When the second electrode layer 5 is too thin, a sufficiently shielding property cannot be obtained easily. On the other hand, when the second electrode layer 5 is too thick, the terminal electrode 3 is thickened and thus it becomes difficult to downsize the ceramic electronic component 100.

The third electrode layer 6 is a plating layer in which a Ni layer (nickel layer) and a Sn layer (tin layer) are laminated, for example. The third electrode layer 6 may be formed by using a plating liquid. For example, the plating layer contains metal or alloy containing at least one element selected from Pd, Au, Ni, and Sn. The third electrode layer 6 is provided to cover the whole outer surface of the second electrode layer 5.

The thickness of the third electrode layer 6 is preferably 4 to 12 µm, more preferably 6 to 10 µm. When the third electrode layer 6 is too thin, electrodes are easily eroded by solder in installing the ceramic electrode component 100 to a circuit. On the other hand, when the third electrode layer 6 is too thick, the terminal electrode 3 is thickened and thus it becomes difficult to downsize the ceramic electronic component 100.

Figure 3:
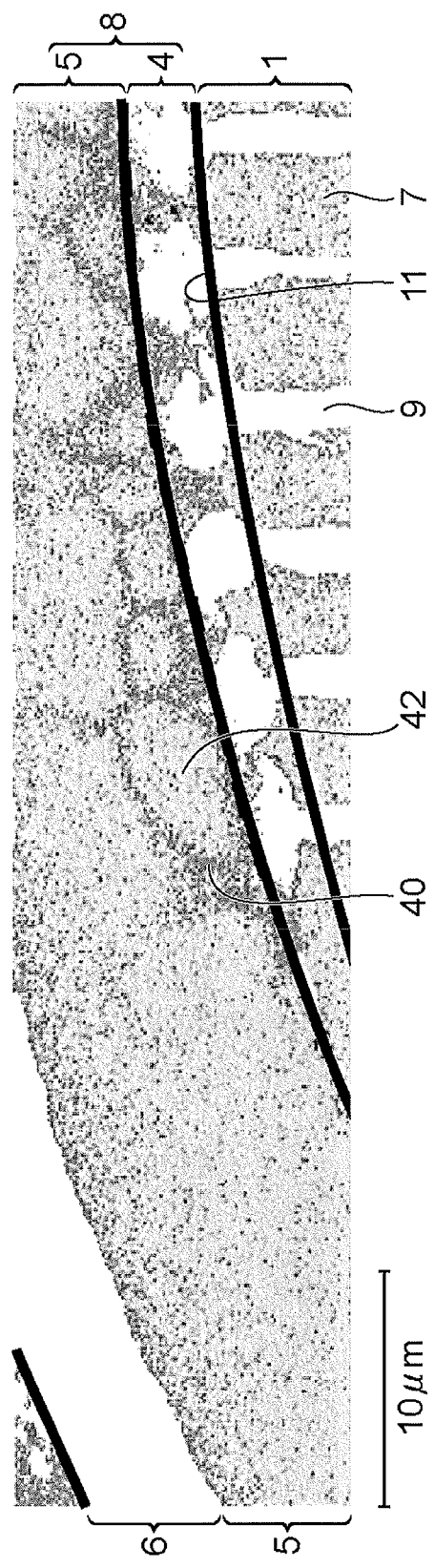
FIG. 3 is an electron microscope photograph showing part of a baked electrode layer of the ceramic electronic component in cross section of FIG. 2 in an enlarged manner.
Figure 4:
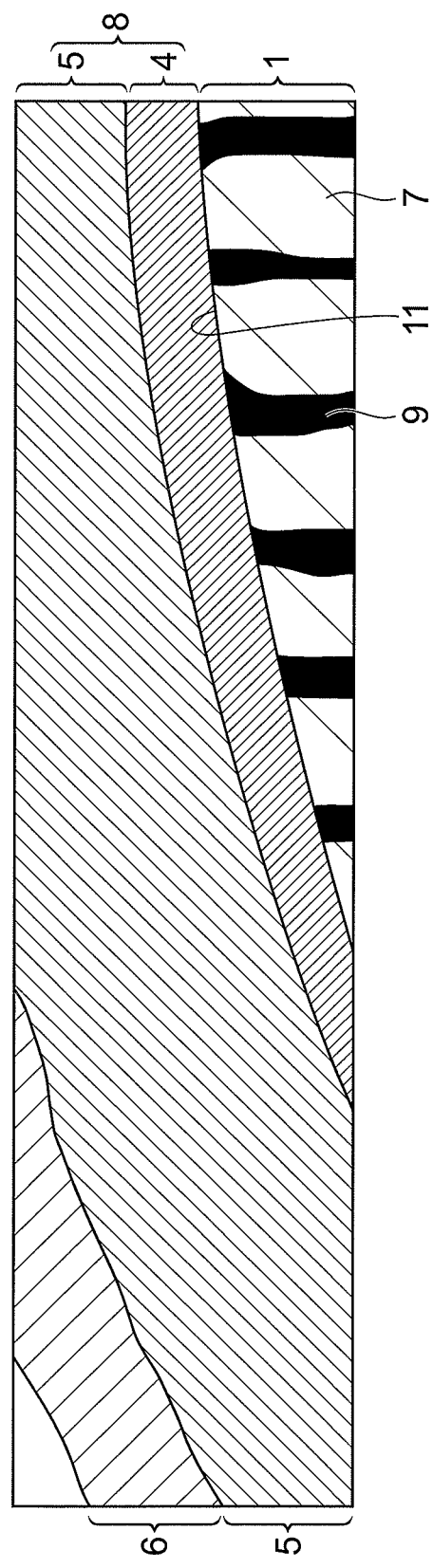
FIG. 4 is a cross-sectional view schematically showing a structure of cross section of the electron microscope photograph shown in FIG. 3.

FIG. 3 is an electron microscope photograph (magnification ratio: 10000) showing the baked electrode layer 8 provided on the end surface 11 and in the vicinity of the corner R13 of the ceramic body 1 in cross section of FIG. 2 in an enlarged manner. Incidentally, in this electron microscope photograph, a line specifying a profile of each layer is drawn. FIG. 4 is a cross-sectional view schematically showing a cross-sectional structure of the electron microscope photograph shown in FIG. 3. As shown in FIG. 3, the internal electrodes 9 are in contact with the first electrode layer 4 on the end surface 11 of the ceramic body 1 by alloying reaction. The metal component (for example, nickel) of the internal electrodes 9 is diffused in the first electrode layer 4. Consequently, the internal electrodes 9 stick out in the first electrode layer 4. Further, the metal component in the internal electrodes 9 is diffused toward the second electrode layer 5 through the first electrode layer 4 from the ceramic body 1.

The second electrode layer 5 mainly contains a crystal grain 42 of metal or alloy. The metal component of the internal electrodes 9 is eccentrically-located in a crystal grain boundary 40 of the crystal grain 42 contained in the second electrode layer 5. Such a structure is formed because the metal component of the internal electrodes 9 passing through the first electrode layer 4 is diffused along the crystal grain boundary 40 during a baking process. Since the metal component of the internal electrodes 9 is eccentrically-located in the crystal grain boundary 40 of the second electrode layer 5 as described above, the second electrode layer 5 is more tightly attached to the ceramic body 1 including the internal electrodes 9 through the first electrode layer 4. Thus, the adhesive strength between the ceramic body 1 and the terminal electrode 3 can be sufficiently high.

The grain diameter of the crystal grain 42 is preferably 3 to 7 µm. When the grain diameter of the crystal grain 42 is less than 3 µm, the shielding effect of the second electrode layer 5 tends to be slightly impaired. When the grain diameter of the crystal grain 42 exceeds 7 µm, blisters are easily generated in the terminal electrode 3. Here, the blister means a phenomenon where a hollow is generated in the terminal electrode 3 and part of the terminal electrode 3 rises quaquaversally. Such a phenomenon is generated by trapping organic components contained in the conductive paste and the conductive green sheet in the baked electrode layer 8 as a remaining carbon and gasifying the remaining carbon by heating during the baking process to form the baked electrode layer 8.

The content of the metal component of the internal electrodes 9 in the second electrode layer 5 is preferably 0.45 mass % or more, more preferably 0.6 mass % or more, further preferably 0.8 mass % or more in order to sufficiently enhance the adhesive strength of the second electrode layer 5 on the first electrode layer 4. However, when the content of the metal component of the internal electrodes 9 in the second electrode layer 5 is too high, it may be difficult to form a uniform plating layer due to the effect of oxide of the metal component formed on the second electrode layer 5 (for example, when the metal component is nickel). Consequently, the third electrode layer 6 tends to be easily peeled from the second electrode layer 5. In view of the above-described circumstances, the content of the metal component of the internal electrodes 9 in the second electrode layer 5 is preferably 5.0 mass % or less, more preferably 4.5 mass % or less, further preferably 3.8 mass % or less.

The content of the metal component of the internal electrodes 9 in the second electrode layer 5 can be determined by EDS (Energy Dispersive X-ray Spectrometry). Incidentally, the content can be calculated as an arithmetic average value of measurement values obtained by measuring the second electrode layer 5 at three or more points at equal intervals of a T dimensional portion and an F dimensional portion of the baked electrode layer 8 formed on the end surface 11 of the ceramic body 1 in the thickness direction.

A preferred embodiment of the method for manufacturing the ceramic electronic component of the present invention will be explained below. The method for manufacturing the ceramic electronic component according to this embodiment is a method for manufacturing the ceramic electronic component 100 shown in FIGS. 1 and 2. The method for manufacturing the ceramic electronic component 100 has a step of forming a ceramic body, a step of forming a conductive green sheet, a step of adhering the conductive paste, a step of attaching a conductive green sheet to the ceramic body, a baking step of forming a baked electrode layer, and a plating step of applying a plating process to the baked electrode layer. The steps will be explained in detail below.

The ceramic body 1 is formed in the step of forming the ceramic body. To form the ceramic body 1, a ceramic green sheet forming the dielectric layer 7 is initially formed. A ceramic slurry may be applied to a PET (polyethylene terephthalate) film using a doctor blade method or the like and be dried to form the ceramic green sheet. For example, the ceramic slurry can be obtained by adding a solvent and a plasticizer to a dielectric material mainly containing barium titanate and mixing them. An electrode pattern of the internal electrode 9 is screen-printed on the formed ceramic green sheet, and the ceramic green sheet is dried. For screen printing of the electrode pattern, an electrode paste prepared by mixing a binder or solvent to at least one type of powder selected from nickel powder and copper powder is used.

A plurality of green sheets with electrode patterns are prepared as described above and laminated. Subsequently, the laminated green sheets with electrode patterns are cut in the direction orthogonal to the laminated direction to form rectangular parallelepiped multilayer chips. Then, the multilayer chips are subjected to a heating process to remove a binder. The heating process is preferably conducted at 180 to 400° C. for 0.5 to 30 hours. The multilayer chips obtained by the heating process are baked at 800 to 1400° C. for 0.5 to 8.0 hours, and chamfered by barrel polishing so that rectangular parallelepiped corners have R-shape. Thus, the ceramic body 1 having an approximately rectangular parallelepiped shape can be obtained.

In the step of forming the conductive green sheet, a paste for the conductive green sheet is initially applied to a support body such as a PET (polyethylene terephthalate) film using a coater or the like to have a thickness of appropriately 70 µm. As the paste for the conductive green sheet, a paste prepared by mixing metal or alloy powder containing at least one element selected from Cu, Ag, Pd, Au, Pt, Fe, Zn, Al, Sn, and Ni, a binder containing thermoplastic resin such as acrylic resin, and an organic solvent may be used.

Figure 5:
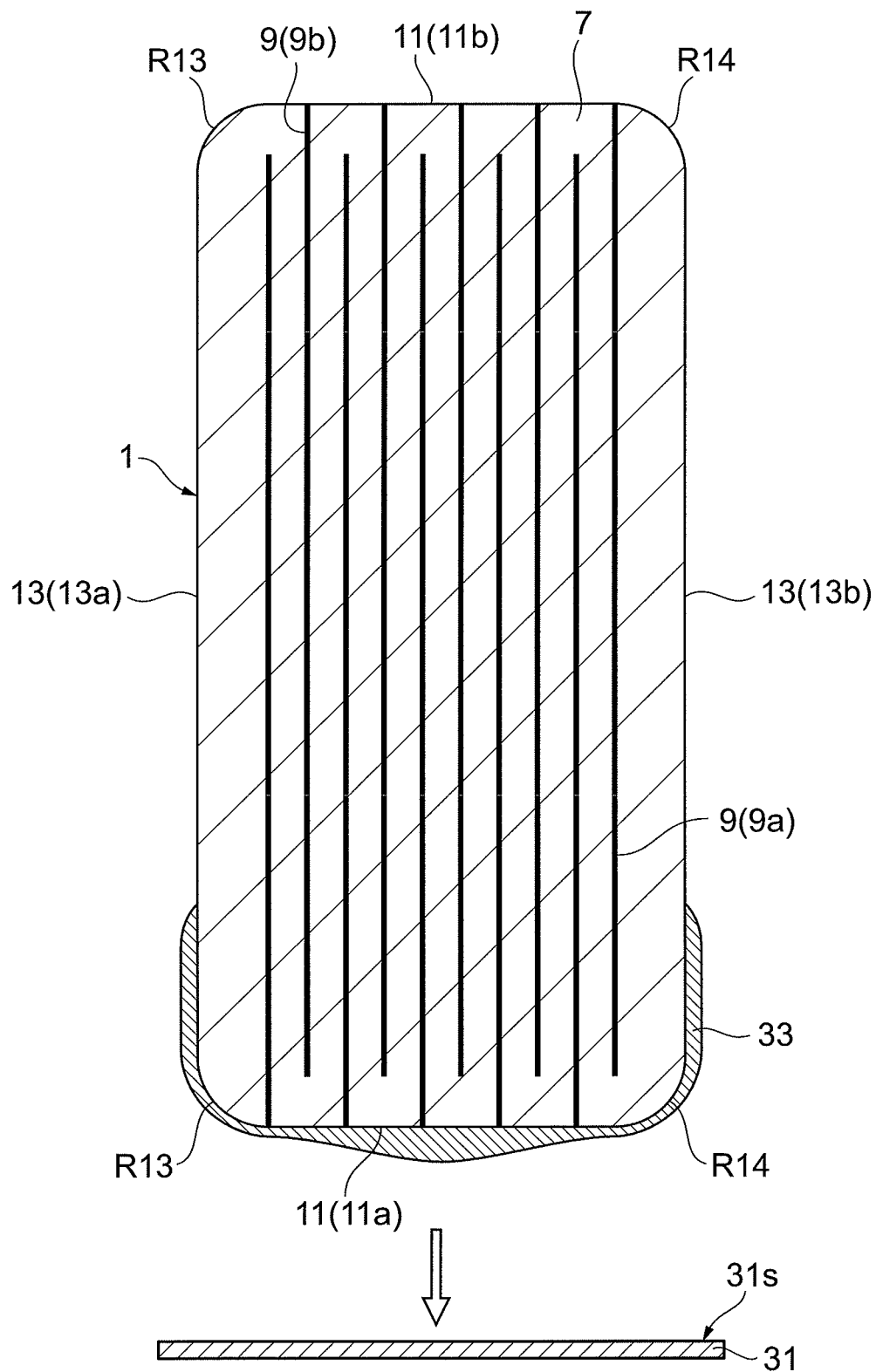
FIG. 5 is a schematic view schematically showing one step of an example of a method for manufacturing the ceramic electronic component of the present invention.

Next, the paste applied on the support body is dried to form the conductive green sheet. For example, the thickness of the conductive green sheet is appropriately 10 to 50 µm. After being dried, the conductive green sheet is cut to a desired size on the support body to form a conductive green sheet 31 (FIG. 5). Here, the conductive green sheet 31 is cut such that a surface 31s attached to the ceramic body 1 is slightly larger than the end surface 11 of the ceramic body 1. After being cut, the conductive green sheet 31 is peeled from the support body. Thus, the conductive green sheet 31 can be obtained.

The content of metal component in the conductive green sheet 31 is preferably 65 to 75 mass %, When the content is less than 65 mass %, the sufficiently excellent shielding effect tends to be impaired. On the other hand, when the content exceeds 75 mass %, blisters tend to be easily generated in the terminal electrode 3.

The average particle diameter of the metal powder or the alloy powder in the conductive green sheet 31 is preferably 0.5 to 1.3 µm. When the average particle diameter is less than 0.5 µm, the sufficiently excellent shielding effect tends to be impaired. On the other hand, when the average particle diameter exceeds 1.3 µm, cracks tend to be easily generated in the terminal electrode 3 formed on the ceramic body 1. The cracks are generated by solvents contained in the conductive paste and the conductive green sheet. Because solvents trapped in the baked electrode layer 8 are decomposed by heating during the baking process. Such cracks may become larger by thermal contraction during the baking process. Here, the average particle diameter means a volume average particle diameter measured using a commercially-available laser diffraction particle size analyzer.

In the step of adhering the conductive paste, the conductive paste is adhered to the end surface 11a of the ceramic body 1, the corners R13 and R14, and some areas of the side surfaces 13 and 15 on the side close to the end surface 11a, The conductive paste may be prepared by adding a glass frit to a component contained in the paste for the conductive green sheet. The method for adhering the conductive paste may be a method for dipping part of the ceramic body 1 in the conductive paste (dip method) or a method for printing the conductive paste.

When the conductive paste is adhered by the dip method, the end surface 11a of the ceramic body 1, the corners R13 to R16, and part of the side surfaces 13 and 15 on the side close to the end surface 11a are dipped in the conductive paste while one end surface 1 la of the ceramic body 1 faces down. Thus, as shown in FIG. 5, the conductive paste 33 is adhered to the end surface 11a of the ceramic body 1, the corners R13 to R16, and part of the side surfaces 13 and 15 on the side close to the end surface 11a. After the conductive paste 33 is adhered, the conductive paste 33 may be scraped by a squeegee or the like for adjusting the thickness of the conductive paste 33.

FIG. 5 is a schematic view schematically showing a cross-sectional structure in the attaching step of the method for manufacturing the ceramic electronic component 100. As shown in FIG. 5, the ceramic body 1 is pressed to the conductive green sheet 31 such that one end surface 11a of the ceramic body 1 faces the surface 31s of the conductive green sheet 31 via the conductive paste 33. Thus, the conductive green sheet 31 is tightly attached to the end surface 11a of the ceramic body 1 by the adhesive force of the conductive paste 33.

The surface 31s of the conductive green sheet 31 is slightly larger than the end surface 11a of the ceramic body 1. Accordingly, not only the end surface 11a of the ceramic body 1 but also the corners R13 to R16 and part of the side surfaces 13 are covered by the conductive green sheet 31.

The step of adhering the conductive paste and the step of attaching the conductive green sheet are conducted on the other end surface 11b of the ceramic body 1, similarly to the end surface 11a. After the conductive green sheet 31 is adhered to both end surfaces of the ceramic body 1 via the conductive paste, the conductive paste is dried. Accordingly, an electrode green body (precursor layer of an electrode) is formed from the conductive paste and the conductive green sheet 31 to cover the end surfaces 11 of the ceramic body 1, the corners R13 to R16, and part of the side surfaces 13 and 15. Subsequently, the electrode green body is heated at temperatures of 300 to 600° C. for 0.2 to 1.5 hours to remove a binder.

In the baking step, the electrode green body formed on the end surface 11 of the ceramic body 1, the corners R13 to R16, and the side surfaces 13 and 15 is baked to form the baked electrode layer 8. The baking is conducted preferably, for example, at 450 to 850° C. for 0.2 to 1.5 hours in the air or reductive atmosphere. Since the baking is conducted under such a situation, the ceramic body 1 can be prevented from being damaged by heat. Moreover, the baked electrode layer 8 can be tightly attached to the ceramic body 1 by diffusing the metal component contained in the internal electrode 9 in the first electrode layer 4 and the second electrode layer 5.

The baked electrode layer 8 has a laminated structure in which the first electrode layer 4 and the second electrode layer 5 are laminated from the side close to the ceramic body 1 on the end surface 11 of the ceramic body 1. The second electrode layer 5 is formed by baking the conductive green sheet 31. The content of a glass component in the second electrode layer 5 is smaller than that in the first electrode layer 4 using the conductive paste, and the total content of metal or alloy in the second electrode layer 5 is larger than that in the first electrode layer 4 using the conductive paste. Thus, the second electrode layer 5 is sufficiently dense. In the later-described plating step, components of a plating liquid or product materials such as hydrogen generated during the plating step can be sufficiently prevented from entering into the ceramic body 1.

The plating step is a step of forming the third electrode layer 6 that is a plating layer on the baked electrode layer 8 provided on the ceramic body 1 by electrically plating the baked electrode layer 8. The plating layer may be obtained by sequentially forming a Ni plating layer and a Sn plating layer by a barrel plating using, for example, Ni plating bath (such as watts bath) and Sn plating bath (such as neutral Sn plating bath).

By the plating step, the terminal electrode 3 having a laminated structure of the first electrode layer 4, the second electrode layer 5, and the third electrode layer 6 as shown in FIG. 2 can be obtained. The plating layer serving as the third electrode layer 6 is formed to be thin along the surface of the baked electrode layer 8. Accordingly, the terminal electrode 3 and the baked electrode layer 8 have the same shape. By the manufacturing method having the above-described steps, the ceramic electronic component 100 can be manufactured.

In the ceramic electronic component 100 obtained by the above-described manufacturing method, the second electrode layer 5 of the terminal electrode 3 is formed using the conductive green sheet 31. Accordingly, as compared when the baked electrode layer 8 of the terminal electrode 3 is formed using only the conductive paste, the thickness F can be thickened while the thicknesses T and H of the terminal electrode 3 are maintained to be thin. Also, the second electrode layer 5 of the terminal electrode 3 has a sufficiently dense structure in which the glass component is small. As a result of the synergetic effect of the thickness and the composition of the terminal electrode 3, the erosion of the ceramic body due to ingress of components of a plating liquid and hydrogen generated during plating can be sufficiently prevented. Further, since the metal component of the internal electrodes 9 is diffused in the second electrode layer 5, the adhesive strength of the terminal electrode 3 to the ceramic body 1 can be enhanced. Thus, the ceramic electronic component capable of being downsized and having excellent adhesive strength between the terminal electrode and the ceramic body 1 can be provided.

Note that, as used herein, the "approximately rectangular parallelepiped shape" is not limited to a cubic shape and a rectangular parallelepiped shape, but includes a shape in which corners of the rectangular parallelepiped shape are chamfered to have R-shape like the shape of the ceramic body 1 according to this embodiment. In other words, it is only required that the ceramic body of the ceramic electronic component according to the embodiment substantially has a cubic shape or a rectangular parallelepiped shape.

The preferred embodiment of the present invention is described above, but the present invention is not limited to the embodiment. For example, the second electrode layer 5 is provided to cover the entire surface of the first electrode layer 4 on the side surfaces 13 and 15 of the ceramic body 1 in the above-described embodiment. However, the second electrode layer 5 may be provided to cover part of the first electrode layer 4. At this time, the third electrode layer 6 is provided on the surface of the first electrode layer 4 on which the second electrode layer 5 is not provided.

Also, the ceramic electronic component 100 is described as a capacitor in the above-described embodiment, but is not limited thereto. The ceramic electronic component of the present invention may be a varistor, an inductor, or an LCR (a composite electronic component of an inductor, a capacitor, and a resistor). Also, the ceramic body 1 may have a varistor layer or a magnetic layer instead of the above-described dielectric layer 7.

EXAMPLES

The present invention will be explained in detail below on the basis of an example and comparative examples. However, the present invention is not limited to the example as described below.

[Manufacturing of Ceramic Electronic Component]

Example 1

<Formation of Ceramic Body>

A ceramic slurry was prepared by mixing a commercially-available $BaTiO_3$ dielectric material powder, a binder, an organic solvent, and a plasticizer. The ceramic slurry was applied to a PET (polyethylene terephthalate) film using a doctor blade method or the like and then dried to form a ceramic green sheet.

Screen-printing was conducted on the formed ceramic green sheet using an electrode paste prepared by mixing a nickel powder with a binder and a solvent, and the ceramic green sheet is dried. Thus, the green sheet with an electrode pattern was formed. Incidentally, the content of the nickel powder in the electrode paste was 60 mass %.

The same method was repeatedly conducted to form a plurality of green sheets with electrode patterns. The plurality of green sheets were laminated to manufacture a laminated body (the laminated number: 375). The laminated body was cut in the direction orthogonal to the laminated direction to obtain rectangular parallelepiped multilayer chips. Rectangular parallelepiped multilayer chips was subjected to a heating process to remove a binder. The heating process was conducted at 180 to ° C. for 0.5 hours, The multilayer chips were baked at 800 to 1400° C. for 0.5 to 8.0 hours. Subsequently, the multilayer chips were chamfered by barrel polishing so that corners of the rectangular parallelepiped were processed to have R-shape. Thus, the ceramic body 1 having an approximately rectangular parallelepiped shape as shown in FIG. 1 was obtained.

<Formation of Conductive Green Sheet>

A paste was prepared by mixing a commercially-available copper powder (average particle diameter: 0.2 to 8 μm), a resin binder containing acrylic resin and an organic solvent. The paste was prepared without using a glass component such as a glass fit. The paste was applied to a commercially-available PET film and was dried. The PET film was cut to a desired size to form the conductive green sheet 31. The content of the copper powder in the conductive green sheet was 70 mass %, and the average particle diameter was 1.0 The shape of the surface 31s of the conductive green sheet 31 was similar to that of the end surface 11 of the ceramic body 1. The area of the surface 31s was larger than the area of the end surface 11 of the ceramic body 1 of the conductive green sheet 31.

<Formation of Baked Electrode Layer>

A conductive paste containing a commercially-available copper powder, a resin binder (acrylic resin binder), a glass frit, and an organic solvent was prepared. As described above, the end surface 11a, the corners R13 to R16 adjacent to the end surface 11a, and some portions of the side surfaces 13 and 15 on the side close to the end surface 11a were dipped in the conductive paste while one end surface 11a of the formed ceramic body 1 faced down. Thus, as shown in FIG. 5, the conductive paste 33 was adhered to the one end surface 11a of the ceramic body 1, the corners R13 to R16, and the portions of the side surfaces 13 and 15 on the side close to the end surface 11a.

As shown in FIG. 5, the one end surface 11a of the ceramic body 1 was pressed to the surface 31s of the conductive green sheet 31 while the end surface 11a of the ceramic body 1 to which the conductive paste 33 was adhered faced down. Accordingly, the conductive green sheet 31 was attached to the end surface 11a. The conductive green sheet was deformed such that a circumferential edge portion along its outer circumference covered some portions of the side surfaces 13 and 15 on the side close to the end surface 11a, the corners R13 to R16, and the tip portion 22. Subsequently, the conductive paste 33 and the conductive green sheet 31 were dried to form an electrode green body having two layers which have different contents of the glass component on the end surface 11a.

Subsequently, an electrode green body was fanned on the side close to the end surface 11b of the ceramic body 1 similarly to the side close to the end surface 11a.

Then, the electrode green bodies formed on the ceramic body 1 were baked at 400 to 850° C. for 0.2 to 5.0 hours in an electric furnace to manufacture a ceramic electronic component having the baked electrode layer 8.

The baked electrode layer 8 had a laminate structure in which the first electrode layer 4 formed from the conductive paste and the second electrode layer 5 formed from the conductive green sheet 31 were laminated in this order from the side close to the ceramic body on the end surface 11 of the ceramic body 1, the corners R13 to R16, and part of the side surfaces 13 and 15 on the side close to the end surfaces 11. The ceramic electronic component according to the example 1 was obtained as described above.

Comparative Example 1

The ceramic body was prepared in the same manner as the example 1. One end surface of the ceramic body, corners provided on the circumferential edge of the end surface, and portions of side surfaces on the side close to the end surface were dipped in the same conductive paste as the example 1. The conductive paste was adhered to the end surface of the ceramic body, the corners, and the portions of the side surfaces on the side close to the end surface. Subsequently, the conductive paste adhered to the ceramic body was dried.

The conductive paste was adhered and dried, as described above, three times in total. Then, the ceramic body having an electrode green body having a three laminated structure on the end surface of the ceramic body, the corners, and the portions of the side surfaces on the side close to the end surface was obtained. The same steps were conducted to the other end surface of the ceramic body. Thus, the ceramic body having a pair of electrode green bodies on both end surfaces was obtained.

The electrode green bodies formed on the ceramic body were baked to manufacture a ceramic electronic component having a baked electrode layer in the same manner as the example 1. This ceramic electrode component had the baked electrode layer 8 having a three laminated structure formed using the conductive paste. The ceramic electronic component according to the comparative example 1 was obtained as described above.

Comparative Example 2

A ceramic body was prepared in the same manner as the example 1. One end surface of the ceramic body, corners provided on the circumferential edge of the end surface, and portions of side surfaces on the side close to the end surface were dipped in the same conductive paste as the example 1. The conductive paste was adhered to the end surface of the ceramic body, the corners, and the portions of the side surfaces on the side close to the end surface. Subsequently, the conductive paste adhered to the ceramic body was dried.

Then, a portion of the ceramic body to which the conductive paste was adhered was dipped in a conductive paste which contains the same component as the conductive green sheet prepared in the example 1 and does not contain a glass component, so that two conductive pastes were laminated. Subsequently, the conductive paste adhered to the ceramic body was dried to form an electrode green body on the ceramic body in which a first electrode layer and a second electrode layer having different contents of a glass component were laminated in this order from the side close to the ceramic body.

The electrode green bodies formed on the ceramic body were baked to manufacture a ceramic electronic component having a baked electrode layer in the same manner as the example 1. The ceramic electronic component according to the comparative example 2 was obtained as described above. The ceramic electronic component according to the comparative example 2 was different from the ceramic electronic component according to the example 1 in that the ceramic electronic component according to comparative example 2 has the second electrode layer formed using the conductive paste.

Comparative Example 3

A ceramic slurry was prepared by mixing a commercially available $BaTiO_3$ dielectric material powder, a binder, an organic solvent, and a plasticizer. Using the ceramic slurry, a ceramic body which had the same size as the laminated body according to the example 1 and in which an electrode pattern for an internal electrode was not formed was manufactured. Similarly to the example 1 except that the ceramic body was used instead of the laminated body according to the example 1, a baked electrode layer was formed on both end surfaces of the ceramic body.

[Measurement of Thickness of Baked Electrode Layer]

The thicknesses of the baked electrode layers 8 of the ceramic electrode components according to the example 1 and the comparative examples 1 and 2 manufactured as described above were measured as described below. Each ceramic electronic component was cut in the direction orthogonal to the side surface 13 and parallel to the side surface 15 to obtain a cut surface of the ceramic electronic component as shown in FIG. 2. The cut surface was observed by a microscope to obtain a thickness T1 (T dimension), a thickness F1 (F dimension), and a thickness H1 (H dimension) of the baked electrode layer 8. Each thickness was measured at ten points to obtain an arithmetic average value, the maximum value, the minimum value of measurement values. The results were shown in Table 1. When the thickness T1 was measured, the thicknesses of the first electrode layer 4 and the second electrode layer 5 were also obtained.

[Evaluation of Shielding Property]

The shielding properties of the ceramic electrode components according to the example 1 and the comparative example 1 manufactured as described above were evaluated by the procedure as follows. The baked electrode layer 8 formed on the ceramic body 1 was dipped in a sealing agent (methacrylate ester monomer) provided for dipping fine pores, and was kept at room temperature for 0.5 hours under a decompression atmosphere. Subsequently, the ceramic body 1 was removed from the sealing agent and heated to 90° C. to thermally cure the sealing agent. After thermal curing, the ceramic electronic component was cut in the direction orthogonal to the side surface 13 and parallel to the side surface 15 to obtain a cut surface of the ceramic electronic component as shown in FIG. 2. The baked electrode layer 8 and the ceramic body 1 on the cut surface were observed by a fluorescence microscope (magnification ratio: 500) to evaluate whether or not a sealing material was diffused in the baked electrode layer 8 and the ceramic body 1. Twelve samples (ceramic electronic components) were evaluated in the same manner for every example and comparative example to count the number of the samples in which the sealing material was diffused in the baked electrode layer 8 and the ceramic body 1. The results were shown in Table 1.

[Evaluation of Adhesive Strength]

The adhesive strength of the ceramic electrode components according to the example 1 and the comparative examples 1 and 3 manufactured as described above were evaluated by the procedure as follows. Firstly, a plating layer (the third electrode layer 6) composed of a Ni plating layer and a Sn plating layer was formed to cover the baked electrode layer 8 of each of the ceramic electronic components according to the example 1 and the comparative examples 1 and 3. The Ni plating layer was prepared using a watts bath, and the Sn plating layer was prepared using a neutral Sn plating bath. Accordingly, the terminal electrode 3 in which the first electrode layer 4, the second electrode layer 5, and the third electrode layer 6 (plating layer) were sequentially laminated from the side close to the ceramic body 1 was formed on the both end surfaces 11 of the ceramic body 1. The terminal electrode 3 and a lead wire separately prepared were connected to each other by solder to obtain a connection body in which the lead wire and the ceramic electronic component were connected via the solder. The adhesive strength between the terminal electrode 3 and the ceramic body 1 at the connection body was measured by conducting a tensile test. In other words, the tensile strength measured by the tensile test was provided as the adhesive strength. The results were shown in Table 1.

[Analysis of Composition of Baked Electrode Layer]

The terminal electrode 3 in which the first electrode layer 4, the second electrode layer 5, and the third electrode layer 6 (plating layer) were sequentially laminated from the side close to the ceramic body 1 was formed on the both end surfaces 11 of the ceramic body 1 in the ceramic electronic component according to the example 1 similarly to when the adhesiveness strength was evaluated.

The ceramic electronic component in which the terminal electrode 3 was formed was cut in the direction orthogonal to the side surface 13 and parallel to the side surface 15 to obtain a cut surface of the ceramic electronic component as shown in FIG. 2. The terminal electrode 3 on the cut surface was observed by an electronic microscope and mapped by an electron probe micro analyser (EPMA) to analyze the compositions of the first electrode layer 4, the second electrode 5, and the third electrode layer 6. Consequently, in the ceramic electronic component according to the example 1, it was confirmed that Ni was diffused in the second electrode layer 5 from the internal electrodes 9 through the first electrode layer 4 as shown in FIG. 3. Also, it was confirmed that Ni was diffused along the crystal grain boundary of the second electrode layer 5.

Based on the result of mapping by EPMA, the Ni content in the second electrode layer 5 and the Ni content in the crystal grain and at the crystal grain boundary of Cu in the second electrode layer 5 were measured. Further, a mass ratio of the Ni content at the crystal grain boundary relative to the Ni content in the crystal grain was obtained.

By the procedure as described above, the Ni content in the second electrode layers 5 of twelve samples for each example and comparative example and the mass ratio of the Ni content at the crystal grain boundary relative to the Ni content in the crystal grain were obtained. An average value, the maximum value, and the minimum value of the obtained values were shown in Table 1.

TABLE 1

| | | Example 1 | Comparative example 1 | Comparative example 2 | Comparative example 3 |
|---|---|---|---|---|---|
| thickness of baked electrode layer T1 (μm) | average value | 19.2 (*1) | 69.6 | 55.7 | — |
| | σ | 1.8 | 9.5 | 9.7 | — |
| thickness of baked electrode layer F1 (μm) | average value | 13.9 | 17.4 | 10.6 | — |
| | σ | 1.7 | 5.5 | 3.8 | — |
| thickness of baked electrode layer H1 (μm) | average value | 22.9 | 27.3 | 27.7 | — |
| | σ | 2.1 | 6.3 | 5.7 | — |
| shielding property | (*2) | 0 | 5 | — | — |
| adhesive strength (kg) | | 6.50 | 5.00 | — | 3.94 |
| Ni content in second electrode layer (mass %) | average value | 1.50 | — | — | — |
| | minimum value | 0.45 | — | — | — |
| | maximum value | 5.00 | — | — | — |
| mass ratio of Ni content at grain boundary relative to Ni content in grain | average value | 1.56 | — | — | — |
| | minimum value | 0.36 | — | — | — |
| | maximum value | 8.39 | — | — | — |

(*1) The thicknesses of the first and second electrode layers were 7.3 μm and 11.9 μm, respectively.
(*2) The number of samples in which the sealing agent was diffused in the baked electrode layer or the ceramic body out of twelve samples is shown.

As shown in Table 1, in the ceramic electrode component according to the example 1 in which the first electrode layer was formed using the conductive green sheet, the thickness T1 (T' dimension) and the thickness H1 (H dimension) of the baked electrode layer 8 were sufficiently thin while the thickness F1 (F dimension) of the baked electrode layer 8 was thick. On the other hand, in the ceramic electronic components according to the comparative examples 1 and 2 in which the baked electrode layers 8 were formed using only the conductive paste, without using the conductive green sheet, the thicknesses T1 and the thicknesses H1 were thicker than those of the baked electrode layer 8 in the ceramic electrode component according to the example 1, but the thicknesses F1 were thin. Also, the thicknesses of the baked electrode layers 8 in the ceramic electronic components according to the comparative examples 1 and 2 were largely varied as compared to the ceramic electronic component according to the example 1. From these results, it was confirmed that the ceramic electronic component according to the example 1 had excellent dimensional accuracy and had a good possibility to be downsized.

Also, the ceramic electronic component according to the example 1 had better shielding property and higher adhesive strength than that according to the comparative examples 1 and 3. When damaged portions of the samples were observed after the evaluation of the adhesive strength, it was confirmed that the samples were fractured at soldered portions in the example 1 while the samples were fractured at boundaries between the ceramic body and the terminal electrode in the comparative examples 1 and 3. From these results, it was confirmed that the ceramic electronic component according to the example 1 having the second electrode layer containing the metal component diffused from the internal electrodes in the example 1 had better shield property and higher adhesive strength as compared to the ceramic electronic components according to the comparative examples.

Thus, a ceramic electronic component capable of being downsized and having excellent adhesive strength between a terminal electrode and a ceramic body can be provided according to the present invention.

What is claimed is:

1. A ceramic electronic component comprising:
    a ceramic body in which internal electrodes containing a metal component is buried, the internal electrodes being exposed to end surfaces of the ceramic body; and
    a pair of terminal electrodes provided to cover end surfaces of the ceramic body,
        wherein each of the terminal electrodes has a first electrode layer and a second electrode layer formed by baking a conductive green sheet from a side close to the ceramic body, and the second electrode layer contains the metal component which is diffused from the internal electrodes, and
        wherein the content of the glass component in the first electrode layer is higher than that in the second electrode layer,
    wherein the second electrode layer is provided to cover part of the first electrode layer on at least one side surface orthogonal to the end surfaces of the ceramic body.

2. A ceramic electronic component comprising:
    a ceramic body in which internal electrodes containing a metal component is buried, the internal electrodes being exposed to end surfaces of the ceramic body; and
    a pair of terminal electrodes provided to cover end surfaces of the ceramic body,
        wherein each of the terminal electrodes has a first electrode layer and a second electrode layer formed by baking a conductive green sheet from a side close to the ceramic body, and the second electrode layer contains the metal component which is diffused from the internal electrodes, and
        wherein the content of the glass component in the first electrode layer is higher than that in the second electrode layer,
        wherein the metal component is eccentrically-located in a crystal grain boundary in the second electrode layer,
    and wherein the second electrode layer is provided to cover part of the first electrode layer on at least one side surface orthogonal to the end surfaces of the ceramic body.

3. A ceramic electronic component comprising:
    a ceramic body in which internal electrodes containing a metal component is buried, the internal electrodes being exposed to end surfaces of the ceramic body; and
    a pair of terminal electrodes provided to cover end surfaces of the ceramic body,
        wherein each of the terminal electrodes has a first electrode layer and a second electrode layer formed by baking a conductive green sheet from a side close to the ceramic body, and the second electrode layer contains the metal component which is diffused from the internal electrodes, and
        wherein the content of the glass component in the first electrode layer is higher than that in the second electrode layer,
    wherein each of the terminal electrodes has a third electrode layer provided by a plating layer covering the second electrode layer,
    and wherein the second electrode layer is provided to cover part of the first electrode layer on at least one side surface orthogonal to the end surfaces of the ceramic body.

* * * * *